United States Patent [19]
Nkansah et al.

[11] Patent Number: 5,962,580
[45] Date of Patent: Oct. 5, 1999

[54] METHOD FOR PROVIDING A WATERBORNE COATING COMPOSITION WITH IMPROVED COLOR ACCEPTANCE

[75] Inventors: Asare Nkansah, Lansdale; Robert David Solomon, Jeffersonville; Stewart Orlyn Williams, Hatfield, all of Pa.

[73] Assignee: Rohm and Haas Company, Phila., Pa.

[21] Appl. No.: 08/473,704

[22] Filed: Jun. 7, 1995

[51] Int. Cl.$^6$ .................................................... C08L 41/00
[52] U.S. Cl. ........................ 524/547; 523/201; 524/817; 526/240; 526/286; 526/287
[58] Field of Search .................................. 524/547, 817; 526/240, 286, 287; 523/201

[56] References Cited

U.S. PATENT DOCUMENTS

| | | | |
|---|---|---|---|
| 3,318,830 | 5/1967 | Condon et al. | 524/817 X |
| 3,663,462 | 5/1972 | Arndt et al. | 521/72 |
| 3,755,236 | 8/1973 | Puskas | 524/817 |
| 3,884,871 | 5/1975 | Herman et al. | 524/817 X |
| 3,950,294 | 4/1976 | Connelly et al. | 524/547 X |
| 4,048,130 | 9/1977 | Brunold et al. | 524/817 X |
| 4,143,020 | 3/1979 | Emmons et al. | 524/817 X |
| 4,226,752 | 10/1980 | Erickson et al. | 525/309 X |
| 4,226,754 | 10/1980 | Yun et al. | 526/218 X |
| 4,332,860 | 6/1982 | Heins et al. | 524/817 |
| 4,477,623 | 10/1984 | Pons et al. | 524/817 X |
| 4,612,343 | 9/1986 | Okuzono et al. | 524/547 |
| 4,801,671 | 1/1989 | Shay et al. | 526/214 |
| 4,812,510 | 3/1989 | Barnett et al. | 524/807 |
| 4,892,902 | 1/1990 | Shioji et al. | 524/547 X |
| 4,970,269 | 11/1990 | Humphries et al. | 524/547 X |
| 4,997,877 | 3/1991 | Graig | 524/817 X |
| 5,006,413 | 4/1991 | Den Hartog et al. | 524/555 X |
| 5,084,502 | 1/1992 | Buscall et al. | 524/547 X |
| 5,141,983 | 8/1992 | Hasegawa et al. | 524/457 |
| 5,166,254 | 11/1992 | Nickle et al. | 524/512 |
| 5,182,327 | 1/1993 | Biale | 524/556 |
| 5,204,404 | 4/1993 | Werner, Jr. et al. | 524/501 |
| 5,219,916 | 6/1993 | Den Hartog et al. | 524/515 |
| 5,219,918 | 6/1993 | Guillaume et al. | 526/240 X |
| 5,262,474 | 11/1993 | Minnis et al. | 524/556 |
| 5,274,027 | 12/1993 | Guillaume et al. | 524/817 X |
| 5,281,261 | 1/1994 | Lin | 524/817 X |
| 5,302,655 | 4/1994 | Guillaume et al. | 524/547 |
| 5,314,945 | 5/1994 | Nickle et al. | 524/507 |
| 5,334,655 | 8/1994 | Carlson et al. | 524/817 X |
| 5,352,726 | 10/1994 | Hall | 524/547 X |
| 5,539,073 | 7/1996 | Taylor et al. | 526/323 |

FOREIGN PATENT DOCUMENTS

| | | | |
|---|---|---|---|
| 0257810 | 5/1963 | Australia | 524/817 |
| 2140463 | 2/1972 | Germany | 524/817 |
| 2420212 | 9/1975 | Germany | 524/817 |
| 0074591 | 7/1978 | Japan | 524/817 |
| 0126093 | 11/1978 | Japan | 524/817 |
| 0038821 | 3/1980 | Japan | 524/817 |
| 0115419 | 9/1980 | Japan | 524/817 |
| 0118730 | 9/1981 | Japan | 524/817 |
| 0038806 | 3/1982 | Japan | 524/817 |
| 0149914 | 8/1984 | Japan | 524/817 |
| 0161406 | 9/1984 | Japan | 524/817 |
| 0217702 | 12/1984 | Japan | 524/817 |
| 2011534 | 1/1987 | Japan | 524/817 |
| 1350282 | 4/1974 | United Kingdom | 524/817 |

*Primary Examiner*—Judy M. Reddick
*Attorney, Agent, or Firm*—Ronald D. Bakule

[57] ABSTRACT

A method for providing a waterborne coating composition having improved color acceptance is provided. More particularly, a method for improving the color acceptance of a waterborne coating composition containing an emulsion-polymerized addition polymer by incorporating a polymerizable surfactant into the polymer with a certain surface coverage of bound surfactant is provided.

3 Claims, No Drawings

METHOD FOR PROVIDING A WATERBORNE COATING COMPOSITION WITH IMPROVED COLOR ACCEPTANCE

This invention relates to a method for providing a waterborne coating composition having improved color acceptance and, more particularly, to a method for improving the color acceptance of a waterborne coating composition containing an emulsion-polymerized addition polymer by incorporating a polymerizable surfactant into the polymer.

Waterborne coating compositions such as paints containing emulsion-polymerized polymeric binders are frequently applied to substrates for decorative as well as protective reasons. A fundamental appearance parameter is the color of the dried coating. The color may be provided by the admixture of at least one predispersed colorant, i.e., a predispersed colored pigment or color concentrate, with a waterborne coating composition to yield a colored waterborne coating composition. It is important that the addition of the predispersed colorant not adversely affect the properties of the wet colored waterborne coating composition or the properties of r appearance of the dried coating film formed therefrom. This set of characteristics is defined herein as good color acceptance.

U.S. Pat. No. 4,939,283 discloses certain surface active compounds having a polymerizable moiety which are useful in the emulsion or suspension polymerization of various monomers to produce an aqueous suspension of polymer particles; also disclosed is the use of the polymer particles in paints, printing inks, adhesives, and the like.

The problem faced by the inventors is the provision of a method for improving the color acceptance of a waterborne coating composition.

STATEMENT OF THE INVENTION

The invention provides a method for providing a waterborne coating composition having improved color acceptance by forming a waterborne coating composition containing at least one pigment and at least one emulsion-polymerized addition copolymer having a Tg from –30 C. to 50° C., the addition copolymer being formed from at least one ethylenically unsaturated monomer and from 0.1% to 5%, by weight based on the weight of the addition polymer, of one polymerizable surfactant monomer, the addition copolymer having surface coverage of bound surfactant from 300 sq. Angstroms/surfactant molecule to 1000 sq. Angstroms/surfactant molecule; and admixing at least one predispersed colorant.

DETAILED DESCRIPTION

The color in a colored waterborne coating composition may be provided by the admixture of at least one predispersed colorant, or predispersed colored pigment, or color concentrate, as are taken herein to have the same meaning, with a waterborne coating composition. Color acceptance is related to the effects of the incorporation of a predispersed colorant into the waterborne coating composition, both in its effect on the properties of the wet colored waterborne coating composition and on its effect on the properties of a dried paint film formed from the colored waterborne coating composition. It is important that the viscosity of the waterborne coating composition be substantially unchanged after admixture with the colorant, that the colored waterborne coating composition exhibit minumum color float (stratification of color) and syneresis, or separation into layers, on standing, and that the color of the dried paint film formed from the colored waterborne coating composition be substantially unaffected by the application of shearing forces to the wet colored waterborne coating composition, shearing which may occur during application of the wet colored waterborne coating composition. This set of characteristics is defined herein as good "color acceptance".

A "waterborne coating composition" herein is defined as a composition containing at least one pigment and at least one emulsion-polymerized addition polymer dispersed in an evaporable medium which is predominantly composed of water. The evaporable medium may contain, in addition to water, at least one water-miscible solvent such as, for example, isopropanol, propylene glycol, ethylene glycol methyl ether, ethylene glycol butyl ether, and propylene glycol propyl ether.

The waterborne coating composition contains from 10% to 70%, by volume based on the volume of the coating composition, of at least one pigment. The pigment is selected from inorganic and organic pigments such as, for example, titanium dioxide, calcium carbonate, polystyrene particles, and void-containing polymeric particles on the basis of color and opacity. Included in the term "pigment" herein are inorganic pigments sometimes referred to as fillers such as, for example, clay. Preferred is titanium dioxide as a predominant pigment.

The emulsion-polymerized addition polymer in the waterborne polymeric composition contains at least one (co) polymerized ethylenically unsaturated monomer such as, for example, esters of (meth)acrylic acid, vinyl esters, vinyl chloride, vinylidene chloride, ethylene, styrene, and butadiene. Polar monomers such as, for example, (meth)acrylic acid, itaconic acid, (meth)acrylonitrile, (meth)acrylamide, dimethylaminoethyl (meth)acrylate, and hydroxyethyl (meth)acrylate may also be incorporated in the polymer.

The emulsion-polymerized addition polymer in the waterborne polymeric composition also contains 0.1% to 5%, by weight based on the weight of the addition copolymer at least one copolymerized polymerizable surfactant monomer. The polymerizable surfactant monomer is a surface active compound having a polymerizable group such as, for example, a (meth)acryl or (meth)allyl group, which surfactant may be used as a emulsifier in an emulsion polymerization. Thus, the polymerizable surfactant functions as both a surfactant and as a comonomer. The polymerizable surfactant monomer may be a cationic, anionic, or nonionic surfactant. Suitable copolymerizable surfactant monomers include, for example, anionic surfactant monomers such as sulfates, phosphates, sulfosuccinate half esters, and sulfosuccinate diesters bearing copolymerizable reactive groups and nonionic surfactant monomers such as nonylphenoxy propenyl polyethoxylated alcohols (available as NOIGEN RN-20 from Dai-ichi Corp. Preferred copolymerizable surfactant monomers are nonylphenoxy propenyl polyethoxylate sulfate available as HITENOL from Dai-ichi Co. and sodium alkyl allyl sulfosuccinate available as TREM LF-40 from Henkel Corp.

The emulsion-polymerized polymer used in this invention is substantially thermoplastic, or substantially uncrosslinked, polymer when it is applied to the substrate, although low levels of deliberate or adventitious crosslinking may be present. When low levels of precrosslinking or gel content are desired low levels of multi-ethylenically unsaturated monomers such as, for example, 0.1%–5%, by weight based on the weight of the emulsion-polymerized polymer, allyl methacrylate, diallyl phthalate, 1,3-butylene glycol dimethacrylate, 1,6-hexanedioldiacrylale, and divinyl benzene may be used. It is important, however, that the quality of the film formation is not materially impaired. Chain transfer agents such as, for example, alkyl mercaptans may be used in order to moderate the molecular weight of the polymer.

The polymerization techniques used to prepare such emulsion-polymerized addition polymers are well known in the art. Conventional surfactants may be used in addition to the copolymerized surfactant such as, for example, anionic and/or nonionic emulsifiers such as alkali or ammonium alkyl sulfates, alkyl sulfonic acids, fatty acids, and oxyethylated alkyl phenols. The amount of additional surfactant used is usually up to 6% by weight, based on the weight of total monomer. Preferred is the use of no additional surfactant in addition to the copolymerized surfactant. Either thermal or redox initiation processes may be used. Conventional free radical initiators may be used such as, for example, hydrogen peroxide, t-butyl hydroperoxide, and ammonium and/or alkali persulfaltes, typically at a level of 0.05% to 3.0% by weight, based on the weight of total monomer. Redox systems using the same initiators coupled with a suitable reductant such as, for example, isoascorbic acid and sodium bisulfite may be used at similar levels.

In another aspect of the present invention the emulsion-polymerized addition polymer may be prepared by a multistage emulsion addition polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion-polymerized polymer may contain the same monomers, copolymerizable surfactant, chain transfer agents, etc. as disclosed herein-above for the emulsion-polymerized addition polymer. The emulsion polymerization techniques used to prepare such dispersions are well known in the art such as, for example, U.S. Pat. Nos. 4,325,856; 4,654,397; and 4,814,373.

The emulsion-polymerized addition polymer has a calculated glass transition temperature, Tg, from −30° C. to 50° C. and an average particle diameter of 50 nanometers to 500 nanometers. Preferred is a calculated glass transition temperature from −5° C. to 35° C. Processes yielding polymodal particle size distributions such as those disclosed in U.S. Pat. Nos. 4,384,056 and 4,539,361, for example, may also be employed.

Glass transition temperatures (Tgs) herein are those calculated as a weighted average of the homopolymer Tg values, that is, for calculating the Tg of a copolymer of monomers M1 and M2, $$Tg(calc.)=w(M1) \times Tg(M1) + w(M2) \times Tg(M2)$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2

The glass transition temperature of homopolymers may be found, for example, in "Polymer Handbook", edited by J. Brandrup and E. H. Immergut, Interscience Publishers.

The surface coverage of bound surfactant on the emulsion-polymerized addition copolymer is from 300 sq. Angstroms/surfactant molecule to 1000 sq. Angstroms/surfactant molecule. This level of bound surfactant is believed to lessen the possible deleterious effects of adding a predispersed colorant to the waterborne coating composition; not intending to be bound by such description, it is believed that the deleterious effects, termed poor "color acceptance" herein result from the addition one or more of the surfactant, water-miscible solvent, pigment dispersant, etc. components of the predispersed colorant which may displace unbound surfactant or adsorbed rheology modifier from the surface of the emulsion-polymerized addition copolymer particles so stabilized, leading to destabilization of the particles. The level of bound surfactant is calculated as shown in Table 5.2 herein, using the measured particle size and surfactant analysis as presented herein-below.

The waterborne coating composition is prepared by paint making techniques which are well known in the coatings art. First, at least one pigment is well dispersed in a waterborne medium under high shear such as is afforded by a COWLES (R) mixer. Then the emulsion-polymerized addition polymer is added under low shear stirring along with other coatings adjuvants as desired. The waterborne coating composition may contain, in addition to the pigment(s) and the addition copolymer, conventional coatings adjuvants such as, for example, emulsifiers, coalescing agents, curing agents, thickeners, humectants, wetting agents, biocides, plasticizers, antifoaming agents, colorants, waxes, and antioxidants.

The solids content of the waterborne coating composition may be from about 20% to about 50% by volume. The viscosity of the waterborne polymeric composition may be from about 50 centipoise to about 10,000 centipoise, as measured using a Brookfield viscometer (Model LVT using spindle #3 at 12 rpm); the viscosities appropriate for different application methods vary considerably.

The waterborne coating composition may be applied to a surface such as, for example, metal, wood, and plastic, using conventional coatings application methods such as, for example, brush, roller, drawdown, dipping, curtain coater, and spraying methods such as, for example, air-assisted spray, airless spray, high volume low pressure spray, and air-assisted electrostatic spray.

A predispersed colorant is a colored pigment which has been dispersed in an aqueous or water-miscible medium by use of mechanical energy, i.e., grinding or shearing by means of dispersing equipment such as, for example, a ball mill and a sand mill. The dispersion process may be effected by the use of auxilliaries such as, for example, surfactants, wetting agents, water-miscible solvents, and dispersants, in addition to mechanical energy. Pigments which are commonly used include inorganic and organic pigments such as, for example, iron oxides, chromium oxide, phthalocyanine blue, and carbon black. The predispersed colorants are usually sold in concentrated form (typically 50% to 70% solids by weight) so that modest amounts can be used in a waterborne coating composition to provide a desired range of color intensities while not compromising the properties of the waterborne coating composition unduly. Typical amounts of predispersed colorants which are used in architectural coatings are from 2 to 4 fluid ounces of colorant per gallon of base paint for light tint bases and pastels, from 4 to 8 fluid ounces of colorant per gallon of base paint for medium tint bases, and from 8 to 16 fluid ounces of colorant per gallon of base paint for deeptone tint bases. Of course, different predispersed colorants are frequently used to provide a wide latitude in color selection. Predispersed colorants are frequently added to a base paint at the point-of-purchase of the colored paint, such as a paint store, followed by admixing the predispersed colorant and the waterborne coating composition by various means such as shaking the can of paint.

The waterborne coating composition which has been applied to a surface is then dried under ambient conditions or at elevated temperatures, as may be desired. The use of polymeric components with a Tg sufficiently below the drying temperature or, in the alternative, the use of levels of volatile coalescents or plasticizers effective to provide a film formation temperature sufficiently below the drying temperature, thereby effecting the formation of a continuous film, is well-known in the art. Preferred is drying under ambient conditions.

Experimental Methods

Measurement of Particle Size Particle sizes of the emulsion polymer was measured using either the BI-90 or CHDF instruments. Particle sizes may be determined using a Brookhaven BI-90 Particle Sizer which employs a light scattering technique. CHDF measurements of particle diameter were performed using a Matec Applied Sciences CHDF 1100 instrument using samples at 0.5 to 5.0% solids content.

Surfactant Analysis Method Samples are prepared for surfactant analysis by diluting 1:10 in an organic solvent (tetrahydrofuran). After being shaken, the 1:10 dilution is again diluted 1:10 using a second organic solvent (methanol). This mixture is shaken and then centrifuged at high speed (45,000 rpm) using an ultracentrifuge. The supernatant is analyzed.

The sample is analyzed on a Waters ActION Analyzer using an anion exchange column. The mobile phase is Milli-Q water/200 mM sodium hydroxide gradient. The flow rate is 1 cm.$^3$/min. and a conductivity detector is used.

Viscosity Measurements KU viscosity was measured with a Stormer Viscometer. ICI viscosity was measured with an ICI cone and plate viscometer. The viscosity of the waterborne coating composition was measured after hand stirring the paint, the predispersed colorant was added, the paint was shaked, and allowed to equilibrate overnight before measurement.

Color Float, Syneresis—Color float, or stratification of color, and syneresis, or separation into layers, of the colored waterborne coating were rated visually after equilibration for 1, 9, or 14 days as noted.

Brush-up/drawdown: Brush shearing is a procedure for determining how well a colorant is accepted by a waterborne coating composition. A film of paint was drawndown with a 0.076 mm. (3 mil) Bird applicator on a Lenetta WB test chart held by a vacuum plate (Gardner Scientific). The film was dried overnight at 25° C./50% Relative Humidity. A small amount of the wet paint was then applied to a section of the dry paint (7.6 cm.×7.6 cm.)(3 in.×3 in.) by brushing with a 2.54 cm. (1 inch) wide dry Nylon bristle paint brush until almost dry (as indicated by a sharp increase in brush drag). The edge of the brushed section was touched with a finger to test for dryness, achieved when the tackiness caused the chart to lift slightly from the workbench. The paint was then dried overnight at 25° C./50% Relative Humidity. "Y" reflectance measurements were then made over the brushed and drawdown areas using a Hunter Labscan II Sphere Spectrophotometer. The Y reflectance of each and the difference between them (ΔY(br-dd) were reported. If ΔY were a negative number, the brushed area was darker, and a colorant flocculation effect was indicated. If ΔY were a positive number, the brushed area was lighter, and a waterborne coating composition pigment (such as TiO2) flocculation effect was indicated. A ΔY of either sign greater than 0.5 is easily seen and is taken to indicate poor color acceptance.

EXAMPLES

Example 1

Preparation of Samples 1–7. A three liter flask was charged with 626 g of deionized water and 10.1 g of Trem LF-40. The solution was heated to 84° C. and maintained under a blanket of nitrogen. The monomer charge was prepared by mixing deionized water, TREM LF-40, 2-ethylhexyl acrylate, butyl acrylate, methyl methacrylate, and methacrylic acid. 48 g of the monomer charge was pumped into the reactor followed by a solution of 1.75 g of ammonium persulfate in 15 g of deionized water. Five minutes later the remaining monomer charge was fed to the reactor over 3 hours at 82–84° C. Ammonium persulfate, sodium carbonate, and isoascorbic acid were added over the same period of time. An addition of tert-butylhydroperoxide and isoascorbic acid followed. The final product was neutralized with 5.8 g of ammonia. The final product, Sample 5, was 45.3% polymer by weight, 109 nm particle diameter, and pH was 7.6. Samples 1–4 and 6–7 were prepared according to the same procedure with the exception that the Trem levels were different according to Table 1.1. Samples 8–9 were prepared according to the same procedure with the exception that the indicated HITENOL polymerizable surfactant was used at the level indicated in Table 1.1

TABLE 1.1

Characterization of Samples 1–9

| SAMPLE | SOAPS | PS (nm) | SOLIDS | TOTAL SOAP (ppm) |
|---|---|---|---|---|
| 1 | 1.0% Trem | 102 | 45.4 | 4284 |
| 2 | 1.0% Trem | 101 | 45 | 4284 |
| 3 | 1.0% Trem | 98 | 45.5 | 4284 |
| 4 | 1.0% Trem | 107 | 45 | 4284 |
| 5 | 1.25% Trem | 109 | 45.3 | 5677 |
| 6 | 0.5% Trem | 120 | 44.7 | 2158 |
| 7 | 0.5% Trem | 128 | 45.4 | 2158 |
| 8 | 1.25% Hitenol HS-10 | 99 | 44.9 | 5355 |
| 9 | 1.25% Hitenol A-10 | 99 | 44.7 | 5355 |

Example 2

Preparation of addition copolymer samples. A three liter flask was charged with 290 g of deionized water. The solution was heated to 57° C. and maintained under a blanket of nitrogen. The monomer charge was prepared by mixing deionized water, NOIGEN RN-20, butyl acrylate, methyl methacrylate, and acrylamide. 0.5 g of acetic acid was added to the reactor. 5 g of a 0.06 weight % solution of ferrous sulfate was added to the reactor followed by 62 g of the monomer charge. Solutions of tert-butylhydroperoxide and lykopon were added. After the temperature stabilized the remaining monomer charge was fed to the reactor over 3 hours at 55–57° C. Ammonium persulfate and Lykopon were added over the same period of time. An addition of tert-butylhydroperoxide and Lykopon followed. The final product was 51.9% polymer, 301 nm particle diameter, and pH was 6.3.

Example 3

Preparation of addition copolymer samples. A three liter flask was charged with 300 g of deionized water . The solution was heated to 85° C. and maintained under a blanket of nitrogen. The monomer charge was prepared by mixing deionized water, HITENOL HS-10, butyl acrylate, vinyl acetate, sodium vinyl sulfonate, and sodium bicarbonate. CELLOSIZE QP-3L (HEC) was added to the reactor. 5 g of a solution of ferrous sulfate was added to the reactor followed by 10 g of a solution of sodium bicarbonate. 56 g of latex polymer was added to the reactor. Then a solution of sodium persulfate were added to the kettle. The monomer charge was fed to the reactor over 3 hours at 71–74° C. Sodiumn persulfate and isoascorbic acid were added over the same period of time. An addition of tert-butyl hydroperoxide and isoascorbic acid followed.

Example 4

Preparation of Comparative Samples A–D. These samples were prepared by conventional emulsion polymerization techniques using as the sole surfactant, a non-polymerizable surfactant, Triton. XN-45S (ammonium salt of nonylphenoxypolyethoxylate sulfate) in the quantities presented in Table 4.1.

TABLE 4.1

Characterization of Comparative Samples A–D.

| COMPARATIVE SAMPLE | SOAPS | PS (nm) | SOLIDS | TOTAL SOAP (ppm) |
|---|---|---|---|---|
| A | 1.25% Triton XN-45S | 105 | 44.3 | 5355 |
| B | 1.25% Triton XN-45S | 101 | 44.4 | 5678 |
| C | 1.25% Triton XN-45S | 93 | 45.5 | 5692 |
| D | 0.5% Triton XN-45S | 121 | 45.1 | 2272 |

Example 5

Characterization of Samples 1–6 and 8-9 and Comparative Samples A–C for free and bound soap and surface coverage of bound soap are presented in Table 5.1 as calculated using the constants and equations in Table 5.2.

TABLE 5.1

Free and Bound soap and surface coverage of bound soap

| SAMPLE NO. | PS (nm) | SOLIDS | TOTAL SOAP (ppm) | FREE SOAP (ppm) | BOUND SOAP (ppm) | COVERAGE OF SOAP A°2/Molecule |
|---|---|---|---|---|---|---|
| 1 | 102 | 45.4 | 4284 | <100 | 4184 | 436 |
| 2 | 101 | 45 | 4284 | <100 | 4184 | 437 |
| 3 | 98 | 45.5 | 4284 | <100 | 4184 | 453 |
| 4 | 107 | 45 | 4284 | <100 | 4184 | 427 |
| 5 | 109 | 45.3 | 5677 | <500 | 5177 | 329 |
| 6 | 120 | 44.7 | 2158 | <500 | 1658 | 921 |
| Comp. A | 105 | 44.3 | 5355 | 4400 | 955 | 2365 |
| Comp. B | 101 | 44.4 | 5678 | 4895 | 783 | 2910 |
| Comp. C | 93 | 45.5 | 5692 | 4755 | 937 | 2711 |
| 8 | 99 | 44.9 | 5355 | 270 | 5085 | 717 |
| 9 | 99 | 44.7 | 5355 | <10 | 5345 | 655 |

TABLE 5.2

Constants and equations used in calculations of Table 5.1.

Volume of Particles = $4/3\pi(PS/2*10E-7)^3$
No. of Particles = (Batch Wt.*%TS/Density)/Vol. Part.
Moles Soap/Particle = (Avogadro's No.*{[(Bound Soap/Total Soap)*Soap Charge]/ Mol.Wt.)/No. of Particles TABLE 5.2-continued Constants and equations used in calculations of Table 5.1.

Surface Area of Particles = $4\pi(PS/2*10E-7)^2$
A °2/molecule = 1/((Mole./Part/SA Part.)/ 1*10E16)
TREM LF-40 = 428 g/mol.
TRITON XN45S = 542 g/mol.
HITENOL HS-10 = 797 g/mol.
HITENOL A10 = 872 g/mol.

Example 6

Preparation of paints

Preparation of waterborne coating composition A. The following materials were combined and ground in a Cowles mill at high speed for 15 minutes. (All quantities are in grams)

| | |
|---|---|
| Water | 20.0 |
| Propylene Glycol | 60.0 |
| Anionic Dispersant (50% solids) (TAMOL 1124) | 6.97 |
| Defoamer (FOAMASTER VL) | 1.0 |
| Biocide (KATHON LX) | 1.5 |
| Titanium dioxide (TI-PURE R-900) | 268.26 |

To the grind were added the following, in order, with slow stirring:

| | |
|---|---|
| Polymeric acrylic binder (RHOPLEX SG-10M) | 489.66 |
| TEXANOL coalescent | 24.48 |

-continued

| | |
|---|---|
| Defoamer (FOAMASTER VL) | 1.0 |
| Anionic acrylic rheology modifier (ACRYSOL RM-5) | 23.0 |
| Water | 170.7 |

The aqueous coating composition was allowed to equilibrate overnight.

Preparation of waterborne coating composition B.

The following materials were combined and ground in a Cowles mill at high speed for 15 minutes. (All quantities are in grams)

| | | |
|---|---|---|
| Water | 20.0 |
| Propylene Glycol | 60.0 |
| Anionic Dispersant | 15.33 |
| (35% solids) | |
| (TAMOL QR-681M) | |
| Defoamer | 1.0 |
| (FOAMASTER VL) | |
| Biocide | 1.5 |
| (KATHON LX) | |
| Titanium dioxide | 268.26 |
| (TI-PURE R-900) | |

To the grind were added the following, in order, with slow stirring:

| | |
|---|---|
| Polymeric acrylic binder | 489.66 |
| (RHOPLEX SG-10M) | |
| TEXANOL coalescent | 24.44 |
| Defoamer | 1.0 |
| (FOAMASTER VL) | |
| Anionic surfactant | 2.0 |
| (TRITON GR-7M) | |
| Urethane rheology modifier | 44.0 |
| (ACRYSOL RM-1020) | |
| Urethane rheology modifier | 4.0 |
| (ACRYSOL RM-825) | |
| Water | 139.41 |

The aqueous coating composition was allowed to equilibrate overnight.

Example 7

Evaluation of tinted paints.

TABLE 7.1

Evaluation of color acceptance.
(5% Tintorama Kn (blue) on total paint).
Waterborne coating composition B.
(SOME places have Tintoram, some Tintorama ??
who makes it? what is the pigment??)

| | Comp. C | Comp. D | Sample 6 | Sample 7 |
|---|---|---|---|---|
| Soap/etc | 1.3% Triton XN45S | 0.5% Triton XN45S | 0.5% Trem | 0.5% Trem |
| Δ KU | | | | |
| /I | 98 | 97 | 104 | 95 |
| /DEq. | −1 | −19 | +7 | +4 |
| Δ ICI | | | | |
| /I | 1.7 | 1.6 | 1.7 | 1.7 |
| /Eq. | +0.2 | −0.15 | +0.5 | |
| 20° Gloss | 43 | 39 | 39 | 39 |
| Comments (color float) | severe | v. severe | v. slight | moderate |
| Y - refl (drawdown) | 31.45 | 30.36 | 31.65 | 31.08 |
| Y - refl (brushup) | 31.23 | 31.06 | 31.19 | 31.25 |
| ΔY (br–dd)* | −0.22 | 0.70 | −0.46 | 0.16 |

Samples 6-7 of this invention exhibit color float superior to that of Comparative Samples C and D. Also ΔY for Comparative D is unacceptable for good color acceptance.

TABLE 7.2

Evaluation of color acceptance
(5% Tintorama N (green) (on total paint)
Waterborne coating composition B.

| | Comp. C | Comp. D | Sample 6 | Sample 7 |
|---|---|---|---|---|
| Soap/etc | 1.3% Triton XN45S | 0.5% Triton XN45S | 0.5% Trem | 0.5% Trem |
| Δ KU | | | | |
| /I | 96 | 94 | 100 | 99 |
| /DEq. | −1 | −22 | +2 | −5 |
| Δ ICI | | | | |
| /I | 1.7 | 1.55 | 1.7 | 1.6 |
| /Eq. | +.20 | +.25 | +.50 | +.30 |
| 20° Gloss | 37 | 32 | 33 | 34 |
| Comments (color float) | mod. | mod.–sev. | slight | sl.–mod. |
| Y - refl (drawdown) | 74.49 | 72.93 | 74.76 | 74.38 |
| Y - refl (brushup) | 74.58 | 73.71 | 74.65 | 74.41 |
| ΔY (br–dd)* | 0.09 | 0.79 | −0.11 | 0.03 |

Samples 6-7 of this invention exhibit color float superior to that of Comparative Samples C and D. Also ΔY for Comparative D is unacceptable for good color acceptance.

TABLE 7.3

Evaluation of color acceptance
(5% Tintorama Kn on total paint).
Waterborne coating composition B.

| | Comp. C | Comp. D | Sample 6 | Sample 7 |
|---|---|---|---|---|
| Soap/etc | 1.3% Triton XN45S | 0.5% Triton XN45S | 0.5% Trem | 0.5% Trem |
| Δ KU | | | | |
| /I | 106 | 95 | 99 | 94 |
| /DEq. | +3 | −20 | +4 | +4 |
| Δ ICI | | | | |
| /I | 1.75 | 1.3 | 1.4 | 1.3 |
| /Eq. | +0.25 | −0.2 | +0.5 | +.25 |
| 20° Gloss | 27 | 27 | 23 | 26 |
| Comments (color float) | slight | severe | none | none |
| Y - refl (drawdown) | 33.50 | 32.77 | 33.50 | 33.25 |
| Y - refl (brushup) | 33.20 | 33.05 | 33.19 | 32.93 |
| ΔY (br–dd)* | −0.30 | 0.28 | −0.31 | −0.32 |

Samples 6–7 of this invention exhibit color float superior to that of Comparative Samples C and D.

TABLE 7.4

Evaluation of color acceptance
(5% Tintorama Kn on total paint).
Waterborne coating composition A.

| | Comp. C | Comp. D | Sample 6 | Sample 7 |
|---|---|---|---|---|
| Soap/etc | 1.3% Triton XN45S | 0.5% Triton XN45S | 0.5% Trem | 0.5% Trem |
| Δ KU | | | | |
| /I | 106 | 106 | 98 | 99 |

TABLE 7.4-continued

Evaluation of color acceptance
(5% Tintorama Kn on total paint).
Waterborne coating composition A.

|  | Comp. C | Comp. D | Sample 6 | Sample 7 |
|---|---|---|---|---|
| /DEq. | +16 | −20 | +21 | +14 |
| Δ ICI |  |  |  |  |
| /I | 1.7 | 1.5 | 1.4 | 1.4 |
| /Eq. | +0.8 | +0.2 | +1.2 | +.8 |
| 20° Gloss | 17 | 4 | 16 | 18 |
| Comments (color float) | moderate | sl.–mod. | sl–mod. | sl.–mod. |
| Y - refl (drawdown) | 32.55 | 29.17 | 32.88 | 32.26 |
| Y - refl (brushup) | 33.01 | 32.17 | 33.32 | 32.75 |
| ΔY (br–dd)* | 0.46 | 3.00 | 0.44 | 0.49 |

Samples 6-7 of this invention exhibit color float equal to or superior to that of Comparative Samples C and D. Also ΔY for Comparative D is unacceptable for good color acceptance and exhibits significantly lower gloss than the other samples.

TABLE 7.5

Evaluation of color acceptance
(5% Tintorama Kn on total paint).
Waterborne coating composition B.

|  | Comp. E | Sample 1 | Sample 2 | Sample 3 | Sample 4 |
|---|---|---|---|---|---|
| Soap/etc | 1.3% Triton XN45S | 1.0% Trem | 1.0% Trem | 1.0% Trem | 1.0% Trem |
| Δ KU |  |  |  |  |  |
| /I | 111 | 102 | 104 | 108 | 106 |
| /DEq. | −1 | +5 | +2 | −1 | +3 |
| Δ ICI |  |  |  |  |  |
| /I | 2.0 | 1.85 | 1.85 | 2.0 | 1.9 |
| IEq. | +0.3 | −0.15 | +0.5 |  |  |
| 20° Gloss | 28 | 21 | 23 | 23 | 25 |
| color float 9 day | mod. | mod. | sl. | mod. | mod. |
| Syneresis 9 day | severe | moderate | slight | slight | slight |
| Y - refl (drawdown) | 29.87 | 30.40 | 30.44 | 29.94 | 30.15 |
| Y - refl (brush-up) | 31.27 | 31.60 | 31.77 | 31.79 | 31.72 |
| ΔY (br–dd)* | 0.75 | 1.20 | 1.27 | 1.86 | 1.57 |

Samples 1–4 of this invention exhibit syneresis superior to that of Comparative Sample E. All samples showed poor ΔY values.

TABLE 7.6

Evaluation of color acceptance
(5% Tintoram Kn on total paint).
Post-addition of TREM LF-40
(added as unpolymerized surfactant monomer).
Waterborne coating composition B.

|  | Comp. F | Comp. F-1 | Comp. F-2 | Comp. F-3 |
|---|---|---|---|---|
| Post-added Soap | None | 0.2% TREM | 0.5% TREM | 1.0% TREM |
| Δ KU |  |  |  |  |
| /I | 83 | 85 | 82 | 82 |
| /Δ Eq. | −5 | −5 | −6 | −6 |
| Δ ICI |  |  |  |  |
| /I | 2.2 | 2.3 | 2.4 | 2.5 |
| /Δ Eq. | −0.4 | 0 | +0.1 | −0.1 |
| 20° Gloss | 38 | 40 | 35 | 35 |
| color float 1/14 da | v. sl. | v. sl. | v. sl. | v. sl. |
| Syneresis 1/14 da | none | none | none | none |
| Y- refl (drawdown) | 30.59 | 30.47 | 30.15 | 29.85 |
| Y - refl (brush-up) | 31.29 | 31.14 | 31.02 | 30.87 |
| ΔY (br–dd)* | 0.70 | 0.67 | 0.87 | 1.02 |

Post-addition of copolymerizable surfactant under norn-polymerizing conditions does not improve color acceptance.

What is claimed is:

1. A method for providing a waterborne coating composition having improved color acceptance comprising forming a waterborne coating composition, said composition comprising at least one pigment and at least one emulsion-polymerizegd addition polymer having a glass transition temperature from −30° C. to 50° C., said addition polymer being formed from at least one ethylenically unsaturated monomer and from 0.1% to 5%, by weight based on the weight of said addition polymer, of one copolymerizable surfactant monomer selected from the group consisting of ethylenically unsaturated polyalkoxylate sulfates and ethylenically unsaturated sulfosuccinates, said addition polymer having surface coverage of bound surfactant from 300 sq. Angstroms/surfactant molecule to 1000 sq. Angstroms/surfactant molecule, said surface coverage of said emulsion-polymerized addition polymer being determined from the polymer particle surface area via measurement at the particle size of said emulsion-polymerized addition polymer and amount of bound surfactant via centrifugation of said emulsion-polymerized addition polymer; and admixing at least one predispersed colored pigment.

2. The method of claim 1 wherein said addition polymer has a glass transition tempetature from −5° C. to 35° C.

3. The method of claim 1 wherein said copolymerizable surfactant monomer is the only surfactant used in the polymerization of said emulsion-polymerized addition polymer.

* * * * *